(12) United States Patent
Bae et al.

(10) Patent No.: US 11,198,111 B2
(45) Date of Patent: Dec. 14, 2021

(54) CATALYST FOR DEHYDROGENATION REACTION FOR LIQUID ORGANIC HYDROGEN CARRIERS (LOHC) AND MANUFACTURING METHOD FOR THE SAME

(71) Applicant: KOREA ADVANCED INSTITUTE OF SCIENCE AND TECHNOLOGY, Daejeon (KR)

(72) Inventors: Joongmyeon Bae, Daejeon (KR); Sanghun Lee, Daejeon (KR); Taehong Kim, Daejoen (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 51 days.

(21) Appl. No.: 16/861,406

(22) Filed: Apr. 29, 2020

(65) Prior Publication Data
US 2021/0138439 A1 May 13, 2021

(30) Foreign Application Priority Data
Nov. 13, 2019 (KR) .................. 10-2019-0144714

(51) Int. Cl.
| *B01J 23/42* | (2006.01) |
| *B01J 35/10* | (2006.01) |
| *B01J 35/00* | (2006.01) |
| *B01J 37/04* | (2006.01) |
| *B01J 23/10* | (2006.01) |
| *B01J 37/08* | (2006.01) |

(52) U.S. Cl.
CPC ............... *B01J 23/42* (2013.01); *B01J 23/10* (2013.01); *B01J 35/0053* (2013.01); *B01J 35/0066* (2013.01); *B01J 35/1061* (2013.01); *B01J 37/04* (2013.01); *B01J 37/088* (2013.01)

(58) Field of Classification Search
CPC ........ B01J 23/10; B01J 23/42; B01J 35/0053; B01J 35/0066; B01J 35/1061; B01J 37/04; B01J 37/088; C01B 3/0015; C01B 2203/107; C01B 2203/1088
See application file for complete search history.

(56) References Cited

U.S. PATENT DOCUMENTS

| 2009/0217922 A1* | 9/2009 | Fukuoka | .................. B01J 29/44 |
| | | | 127/37 |
| 2013/0310605 A1* | 11/2013 | Salem | ..................... B01J 23/40 |
| | | | 562/592 |

FOREIGN PATENT DOCUMENTS

| JP | 2019-042705 | 3/2019 |
| KR | 10-2015-0097558 | 8/2015 |
| KR | 10-2016-0046236 | 4/2016 |
| KR | 10-2019-0093382 | 8/2019 |

OTHER PUBLICATIONS

Machine Translation of Cho et al (KR 10-2016-0046236), published Apr. 28, 2016.*

Office Action dated Feb. 21, 2021 corresponding to Korean Patent Application No. 10-2019-0144714, 5 pages.

* cited by examiner

Primary Examiner — Brian A McCaig

(57) ABSTRACT

The present disclosure provides a catalyst for dehydrogenation of liquid organic hydrogen carriers, including: a support; and a catalytically active ingredient on the support, wherein the support has a pore size of 10 nm or more.

6 Claims, 5 Drawing Sheets

< Prior Art >

< Prior Art >

< Prior Art >

CATALYST FOR DEHYDROGENATION REACTION FOR LIQUID ORGANIC HYDROGEN CARRIERS (LOHC) AND MANUFACTURING METHOD FOR THE SAME

CROSS-REFERENCE TO RELATED APPLICATION

This application claims priority of Korean Patent Application No. 10-2019-0144714, filed on Nov. 13, 2019, in the KIPO (Korean Intellectual Property Office), the disclosure of which is incorporated herein entirely by reference.

BACKGROUND OF THE INVENTION

Field of the Invention

The present disclosure relates to a catalyst for dehydrogenation of liquid organic hydrogen carriers and a method for preparing the same. More particularly, the present disclosure relates to a catalyst for dehydrogenation of liquid organic hydrogen carriers which has a high reaction rate for dehydrogenation and uses no carbon and organic materials in its support to allow long-term use, and a method for preparing the same.

Description of the Related Art

As 159 countries signed the accord for inhibiting an increase in global temperatures within 2° C. in the $21^{st}$ United Nations Framework Convention on Climate Change (COP21) for inhibiting a climate change in 2015, Korea also participated therein. Energy conversion is essentially required for inhibiting a climate change, and all industries faced a need for decarbonization in the corresponding fields. Under these circumstances, hydrogen stands out as a novel energy source.

Liquid organic hydrogen carriers (LOHC) have been given many attentions as technology of storing hydrogen after its production. For example, Korean Patent Publication No. 2015-0097558 discloses a compound for liquid organic hydrogen carriers. The compound is liquid at room temperature, includes elemental carbon and hydrogen exclusively, and is a mixture of at least two compounds forming a composite mixture that can be used as a heat transfer liquid from known individual compositions.

FIG. 1 illustrates liquid organic hydrogen carriers based on benzene rings.

Referring to FIG. 1, the liquid compound includes a benzene group. An organic compound, such as dibenzyltoluene (DBT), containing at least two benzene groups is used. Then, the organic compound is allowed to react with hydrogen so that hydrogen may be stored and released. To accomplish the storage and release of hydrogen, double bonds in the benzene ring are cleaved and six hydrogen atoms are stored. In addition, a pressure of 10-50 bars is required for hydrogen storage and hydrogen release occurs under ambient pressure.

FIG. 2 is a graph illustrating hydrogen storage capacity and FIG. 3 is a schematic view illustrating the development direction of hydrogen storage technology.

Referring to FIG. 2 and FIG. 3, liquid organic hydrogen carriers show a capacity corresponding to at least 4 times of the capacity of a lithium ion battery and have a hydrogen storage density corresponding to at least two times of the hydrogen storage density of a compressed hydrogen system.

By virtue of such advantages, continuous studies have been carried out to store hydrogen produced from new & renewable energy in the form of a liquid compound and to use it as an energy storage system, as shown in FIG. 3.

In the case of liquid hydrogen carriers according to the related art, a catalyst synthesized by impregnating a carrier, such as alumina or carbon, with a noble metal catalyst was used to carry out dehydrogenation. However, the catalyst according to the related art is problematic in that the metal catalyst shows low dispersibility during application of metal to the surface of the carrier, the catalyst shows a reduced specific surface area due to aggregation of the metal catalyst during the reaction, and the catalyst may be physically desorbed due to low bindability of the metal catalyst with the carrier. For these reasons, the catalyst obtained by the impregnation process shows low activity and physical durability.

To solve the above-mentioned problems, a novel catalytic process is required. However, the studies conducted to date have focused on improvement of reaction rate through development of a dehydrogenation reactor, rather than development of a catalyst. This is because some issues that have been spotlighted to date are as follows. Dehydrogenation of LOHC is a reaction requiring a high reaction heat of about 64 kJ mol H2, hydrogen is generated in a volume larger than the volume of LOHC by several tens of times by the nature of LOHC dehydrogenation, and thus heat transfer required for dehydrogenation of LOHC is limited to inhibit the reaction rate.

However, as recent LOHC systems have been proved actively, demonstration of a reactor capable of overcoming a heat transfer issue has been conducted intensively. However, catalysts for dehydrogenation of LOHC developed to date still uses a commercially available catalyst based on the impregnation process.

SUMMARY OF THE INVENTION

A technical problem to be solved by the present disclosure is to provide a novel catalyst for dihydrogen suitable for LOHC and having a high reaction rate, and a method for preparing the same.

In one general aspect, there is provided a catalyst for dehydrogenation of liquid organic hydrogen carriers, including: a support; and a catalytically active ingredient on the support, wherein the support has a pore size of 10 nm or more.

According to an embodiment of the present disclosure, the catalytically active ingredient may include at least one selected from Pt, Ni, Pd, Ru, Ir and Re, and the support may be at least one of $CeO_2$, $TiO_2$ and $SiO_2$.

According to another embodiment of the present disclosure, the catalytically active ingredient may be Pt and the support may be $CeO_2$. In addition, Pt may be used in an amount of 5 wt % based on $CeO_2$.

According to still another embodiment of the present disclosure, the liquid compound may be dibenzyltoluene (DBT).

According to still another embodiment of the present disclosure, the catalyst for dehydrogenation of liquid organic hydrogen carriers is calcined after it is burned by the glycine-nitrate process (GNP).

In another aspect of the present disclosure, there is provided a method for preparing a catalyst for liquid organic hydrogen carriers, including the steps of: mixing a support precursor and a precursor of catalytically active ingredient, in the form of a nitrate, together with glycine in a solution;

carrying out combustion of the mixture obtained from the mixing step; and carrying out calcination of powder obtained from the combustion step.

According to an embodiment of the present disclosure, the support has a pore size variable depending on temperature of the calcination step, the support precursor is cerium (III) nitrate hexahydrate, and the precursor of catalytically active ingredient is tetraamineplatinum (II) nitrate.

In still another aspect of the present disclosure, there is provided a catalyst for dehydrogenation of liquid organic hydrogen carriers obtained by the above-defined method.

According to the embodiments of the present disclosure, there are provided a catalyst capable of improving the reaction rate of dehydrogenation by about 10 times or more, and a method for preparing the same. It is possible to significantly improve the catalytic reaction rate by using the same amount of noble metal, and thus to reduce the cost of catalyst and system volume and cost resulting from a decrease in reactor size. In addition, it is possible to facilitate supply of reaction heat, which, otherwise, is pointed out as a limitation in LOHC, by virtue of a decrease in reactor size. Thus, it is possible to expect improvement of system efficiency. It is also possible to ensure higher electric power storage density based on volume and weight as compared to the battery-based electric power storage technology.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
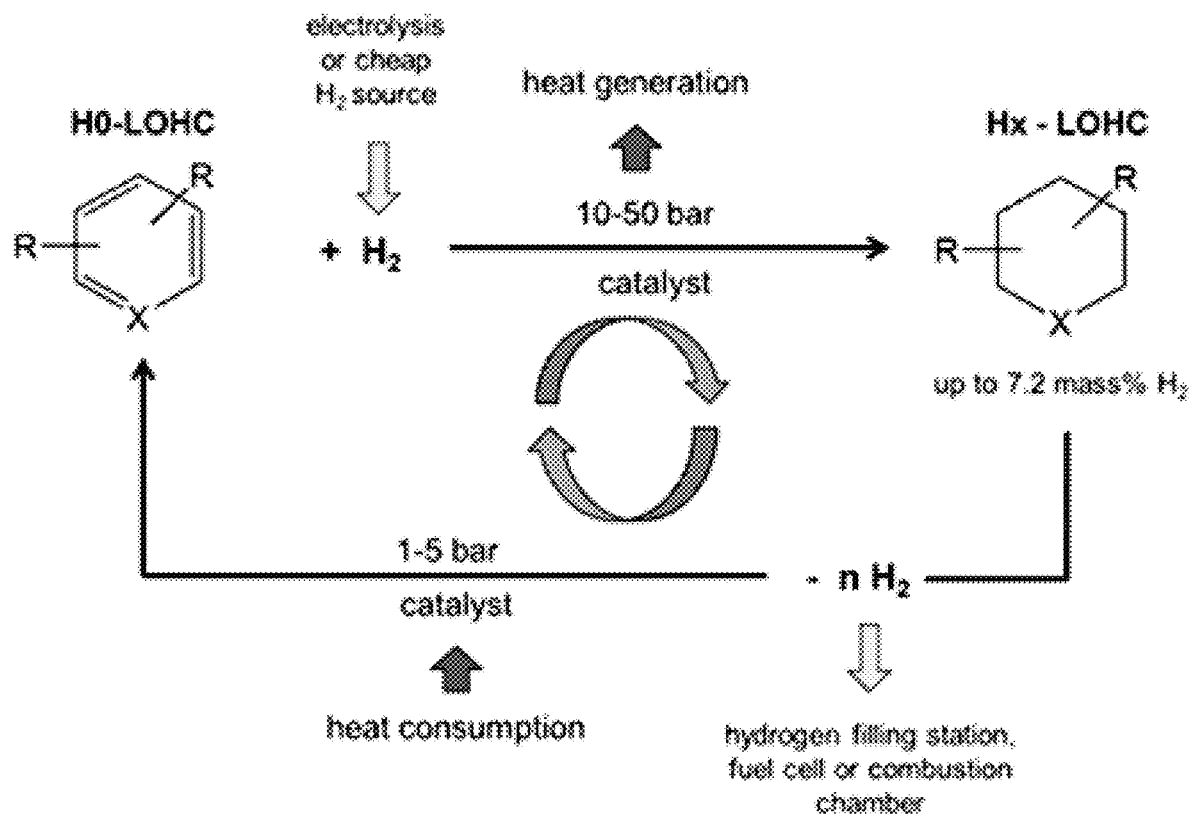
FIG. 1 illustrates liquid organic hydrogen carriers (LOHC) based on benzene rings.
Figure 2:
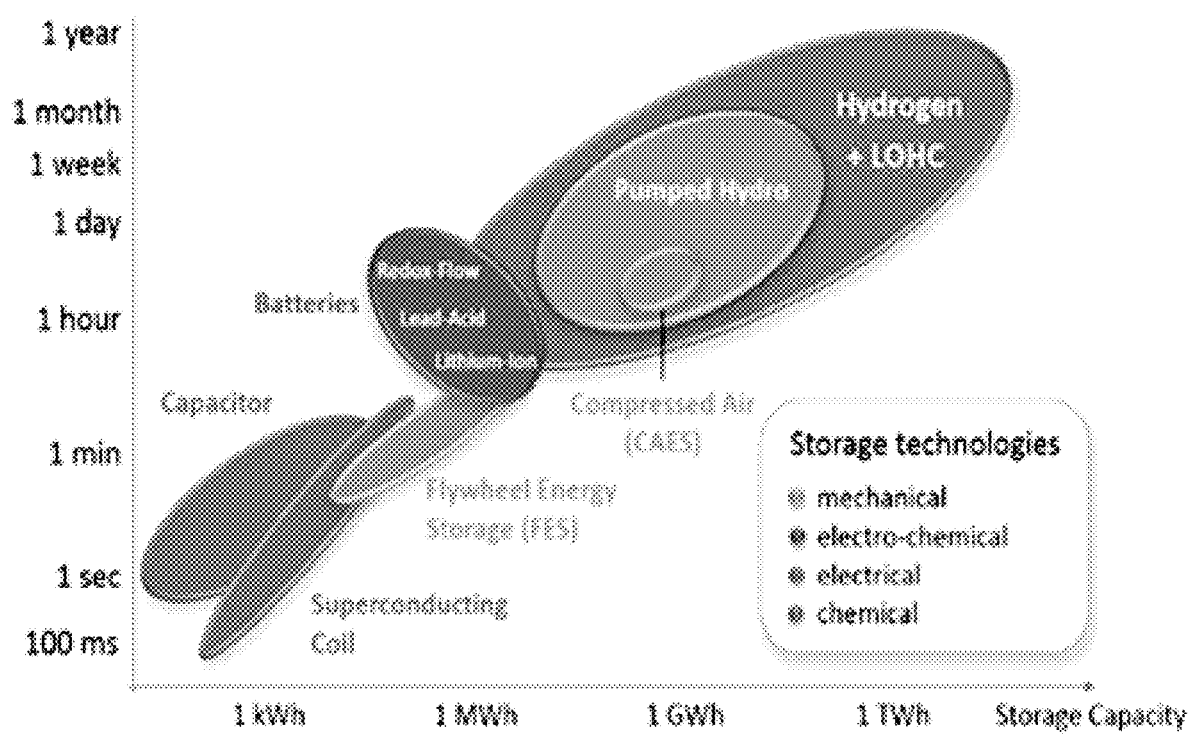
FIG. 2 is a graph illustrating hydrogen capacity.
Figure 3:
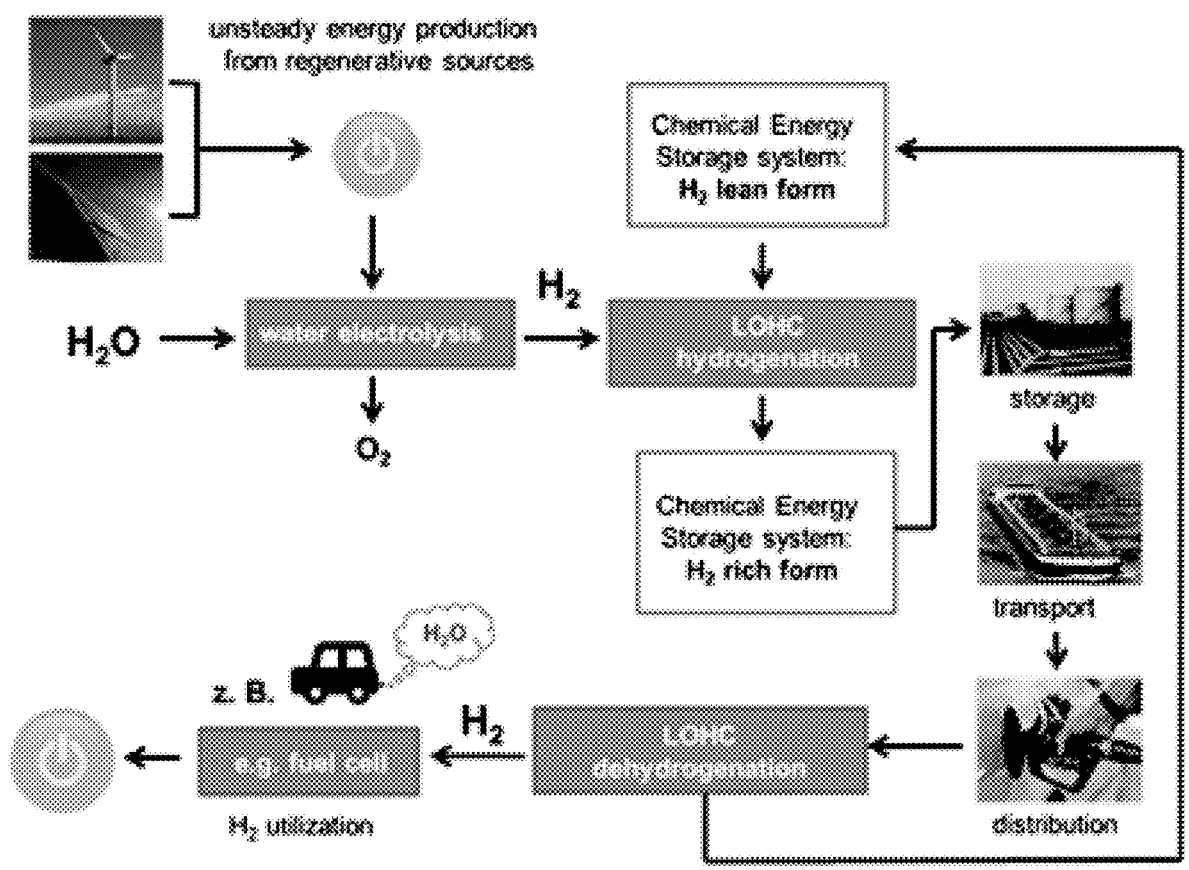
FIG. 3 is a schematic view illustrating the development direction of hydrogen storage technology.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

According to an embodiment of the present disclosure, dibenzyltoluene (DBT) is suggested as a compound for dehydrogenation of liquid organic hydrogen carriers (LOHC), but the scope of the present disclosure is not limited thereto. Any compounds for liquid organic hydrogen carriers capable of binding/release of hydrogen are also included in the scope of the present disclosure.

First, as shown in dibenzyltoluene (DBT) depicted in FIG. 1, it can be seen that DBT includes two benzene rings and toluene, and thus has a significantly large size.

Therefore, mass transfer is important for catalytic reaction. Particularly, since DBT is present in a liquid state during dehydrogenation, mass transfer is more important as compared to gaseous reaction. Therefore, it is very important to develop a support having a large pore size and facilitating mass transfer.

Under these circumstances, according to the present disclosure, there is provided a novel catalyst for dehydrogenation of liquid organic hydrogen carriers (LOHC) having a large specific surface area as well as a large pore size, and a method for preparing the same which allows mass production and control of physical variables, such as pore size.

According to the related art, catalysts using graphene, metal organic frameworks (MOF), or the like, have been studied in order to synthesize a nano-catalyst having a high specific surface area. However, such catalysts fundamentally include carbon and organic substances, and thus it is difficult to use such catalysts as catalysts for DBT dehydrogenation.

This is because DBT is partially decomposed to cause carbon deposition on the surface of a noble metal catalyst, when the hydrogen storage compound, such as DBT, is subjected to dehydrogenation.

Figure 4:
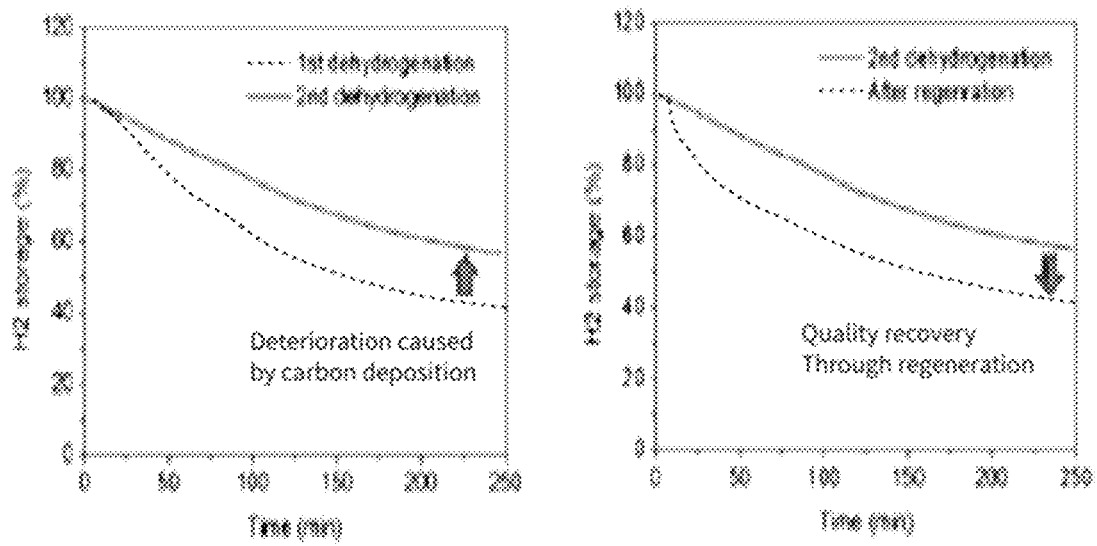
FIG. 4 illustrates recovery of quality through regeneration against deterioration caused by carbon deposition of the hydrogen storage compound.

FIG. 4 illustrates recovery of quality through regeneration against deterioration caused by carbon deposition of the hydrogen storage compound.

Referring to FIG. 4, the catalyst is deteriorated as carbon is deposited and thus its catalytic activity is decreased, as shown in the left side of FIG. 4. Therefore, a regeneration process for removing carbon under oxidizing atmosphere is required to remove the deposited carbon. In this case, it is possible to recover the original catalytic activity as shown in the right side of FIG. 4. However, when supports, such as graphene or MOF, are used during the regeneration step, the supports are decomposed undesirably. Thus, it is difficult to use the catalysts using such supports as catalysts for a long time.

Therefore, there is a need for a novel type of oxide support-based nano-catalyst suitable for a hydrogen storage compound of LOHC and capable of solving the problem related with carbon deposition.

Under these circumstances, the present disclosure provides a catalyst for dehydrogenation of liquid organic hydrogen carriers (LOHC) which includes a support having a pore size of 10 nm or more, and a method for preparing the same.

To optimize the effect of the above-defined range of pore size, it is preferred to use a metal catalyst in an amount of 2-7 wt % based on the support. When the metal catalyst is used in an amount lower than the above-defined range, reaction activity is degraded. When the metal catalyst is used in an amount larger than the above-defined range, homogeneity of catalyst dispersion is degraded due to an excessively large amount of metal catalyst, resulting in degradation of catalytic activity.

EXAMPLE

Figure 5:
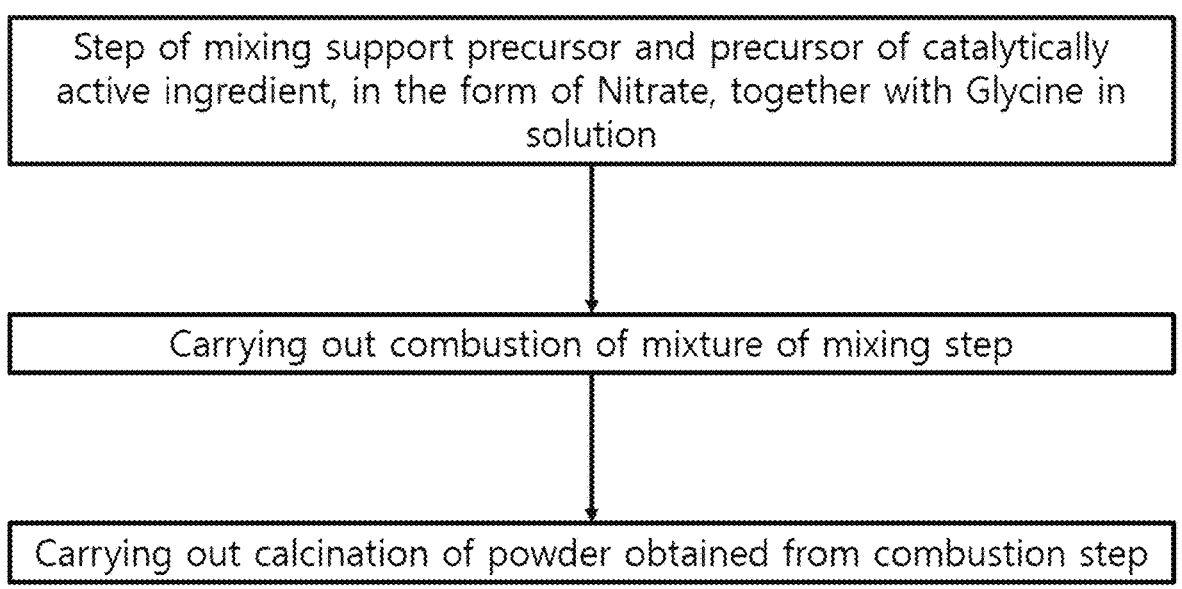
FIG. 5 and FIG. 6 are flow charts illustrating the method for preparing a catalyst according to an embodiment of the present disclosure.
Figure 6:
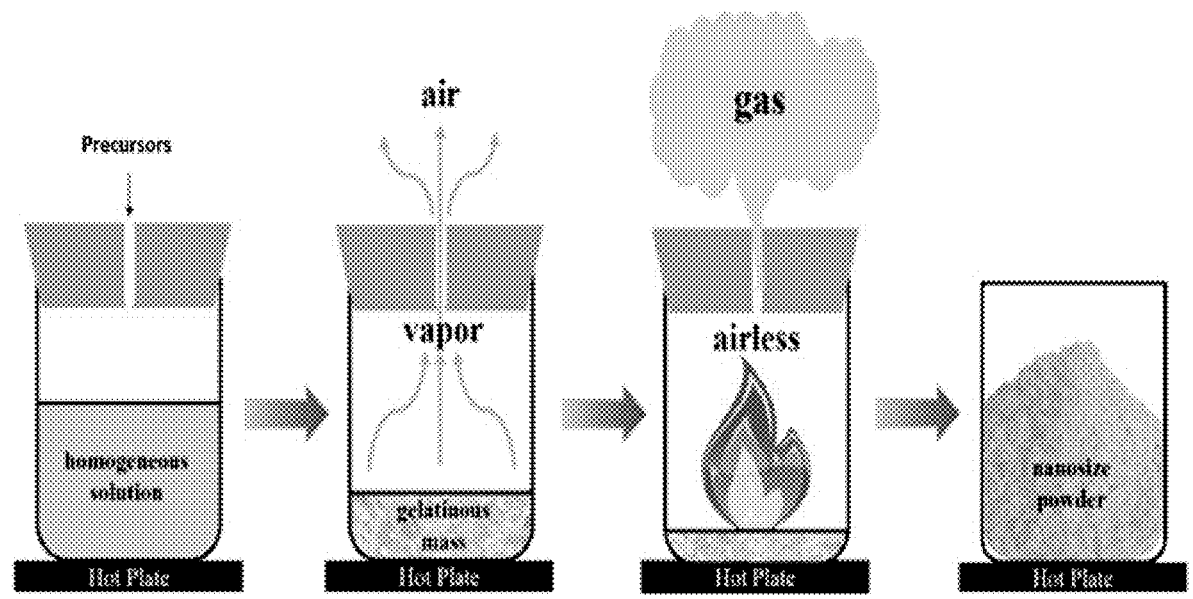

FIG. 5 and FIG. 6 are flow charts illustrating the method for preparing a catalyst according to an embodiment of the present disclosure.

Referring to FIG. 5 and FIG. 6, the catalyst is prepared by using the glycine nitrate process (GNP) based on combustion of glycine and nitrate, and the process includes the following steps in detail.

To carry out the process, the support precursor and the precursor of catalytically active ingredient include nitrate, and they are mixed with glycine to form a mixed solution, which, in turn, is subjected to combustion. Then, the resultant powder is further calcined to obtain a catalyst. In other words, the support may have a pore size controllable depending on the calcination temperature of the powder obtained after the combustion, as described in more detail hereinafter.

According to an embodiment of the present disclosure, the catalyst precursor is mixed with deionized water and the resultant aqueous solution is heated to carry out gelling of the catalyst precursor mixture. The catalyst precursor mixture includes the support precursor, catalyst precursor and glycine causing combustion. According to an embodiment of the present disclosure, the support precursor may be cerium (III) nitrate hexahydrate or aluminum nitrate nonahydrate, and the precursor of catalytically active ingredient may be tetraamineplatinum (II) nitrate, but the scope of the present disclosure is not limited thereto. In other words, any precursors containing nitrate causing combustion with glycine and including a support or active ingredient are included in the scope of the present disclosure.

As described hereinabove, cerium (III) nitrate hexahydrate or aluminum nitrate nonahydrate was used as a support precursor, and tetraamineplatinum (II) nitrate was used as a catalyst metal precursor according to an embodiment of the present disclosure. In addition, the precursors were dissolved in deionized water together with glycine. Herein, the metal catalyst was used at a ratio of 5 wt % within the above-defined range of 2-7 wt %. The mixture was heated at a temperature of about 250-350° C. to cause combustion. Then, after the combustion, the resultant powder was recovered and heated in an electric furnace at a temperature of about 500-800° C. for 4 hours to carry out calcination of the catalyst. When the metal catalyst is used in an amount lower than the above-defined range, reaction activity is degraded. When the metal catalyst is used in an amount larger than the above-defined range, homogeneity of catalyst dispersion is degraded due to an excessively large amount of metal catalyst, resulting in degradation of catalytic activity.

Test Example 1

DBT dehydrogenation was carried out by using the catalysts, $Pt/Al_2O_3$ (Comparative Example) and $Pt/CeO_2$ (Example) obtained from the above-described Example. DBT was used as a hydrogen storage compound and the catalysts were used in an amount of 0.15 mol % at 300° C. to carry out evaluation.

Figure 7:
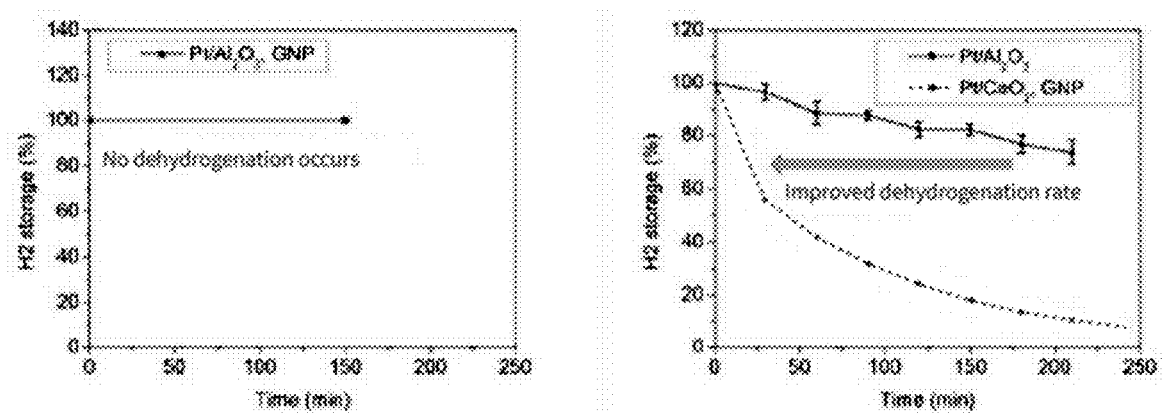
FIG. 7 shows the results of dibenzyltoluene (DBT) dehydrogenation test of Pt/Al$_2$O$_3$ (Comparative Example) and Pt/CeO$_2$ (Example) according to an embodiment of the present disclosure.

FIG. 7 shows the results of DBT dehydrogenation test of $Pt/Al_2O_3$ (Comparative Example) and $Pt/CeO_2$ (Example) according to an embodiment of the present disclosure.

Referring to FIG. 7, in the case of Comparative Example, it is not possible to identify dehydrogenation as shown in the left-side graph of FIG. 7. In other words, even though a catalyst containing platinum is used, no reaction occurs. This cannot be explained based on the general understanding. After carrying out $N_2$ physical adsorption analysis, the catalyst, $Pt/Al_2O_3$, has a pore size of 4.9 nm, which is smaller than 10 nm, even though it is prepared by the same GNP process.

In other words, while the support, $Al_2O_3$, is a widely used catalytic support by virtue of its large specific surface area, DBT has a significantly large size since it includes two benzene rings and toluene. Thus, it is thought that mass transfer for transporting reactants toward the metal catalyst surface through the pores of the support is important for dehydrogenation of DBT. Based on this, it is thought that the catalyst, $Pt/Al_2O_3$ prepared by GNP shows low reaction activity for DBT dehydrogenation. Therefore, the above results suggest that a catalytic support for dehydrogenation compounds for LOHC should have a predetermined range of size (10 nm or more) to accelerate mass transfer.

The right-side graph of FIG. 7 shows the results of dehydrogenation of the catalyst (Example) using $CeO_2$ as a catalyst. Referring to FIG. 7, the commercially available catalyst accomplishes dehydrogenation to about 25% during the reaction for 210 minutes. On the contrary, it can be seen that the catalyst according to the present disclosure accomplishes DBT dehydrogenation to the same level merely in about 20-30 minutes. After the catalyst is analyzed through $N_2$ physical adsorption and CO chemical adsorption, the results are shown in the following Table 1.

TABLE 1

|  | $Pt/Al_2O_3$ (commercially available catalyst) | $Pt/CeO_2$ (GNP) |
| --- | --- | --- |
| Pore size (nm) | 9.8 | 12.6 |
| Metal specific surface area (m²/g metal) | 54.5 | 126.2 |
| Metal dispersibility (%) | 22.1 | 51.1 |

As can be seen from the results of Table 1, the catalyst according to the present disclosure has a pore size (12.6 nm larger than 10 nm) at least two times larger than the pore size (4.9 nm) of the $Pt/Al_2O_3$ catalyst prepared by GNP, and has a larger pore size and larger metal specific surface area and higher metal dispersibility as compared to the known commercially available catalyst. In other words, it can be seen from the above results that the catalyst for a large-size hydrogen storage compound should have a pore size of 10 nm or more, preferably. However, when the pore size is 30 nm or more, the supporting effect of the support may be degraded due to such excessively broad pores. Thus, the above-defined range of pore size is preferred.

As a result, it can be seen that the $CeO_2$ precursor allows more vigorous combustion as compared to the $Al_2O_3$ precursor, thereby allowing formation of large pores in the support. Unlike the commercially available catalyst, in the case of $Pt/CeO_2$ catalyst prepared through GNP, the support and metal form a composite together through rapid combustion, the metal is dispersed homogeneously in the support and the metal is present in the crystal structure of the catalyst, and thus aggregation of metal is minimized during the calcination to provide significantly high reaction activity.

However, it is not possible to explain such improvement of catalytic quality to 10 times or more merely through an increase in metal specific surface area to about 2 times. It is thought that the above results are derived from the chemical interaction between the platinum catalyst and $CeO_2$ support as well as physical properties of the catalyst. In other words, the $CeO_2$ support has alkaline property as compared to the conventionally used $Al_2O_3$ support. Thus, it is thought that the $CeO_2$ support facilitates release of hydrogen, which can function as a rate determining step (RDS) in dehydrogenation of DBT on the platinum surface, through the interaction with platinum. Therefore, it can be expected that the present disclosure is applicable to any supports having higher alkalinity than $Al_2O_3$, and particular examples thereof include $CeO_2$, $ZrO_2$, $TiO_2$, MgO, $SnO_2$, or the like (See, Optical basicity: a scale of acidity/basicity of solids and its application to oxidation catalysis (2006)).

In addition, it is thought that when preparing the catalyst through GNP according to the present disclosure, platinum is mixed homogeneously with the $CeO_2$ support in a nano-scale to further improve the above-mentioned effect.

As a result, according to the present disclosure, GNP is established as a process for preparing a nano-catalyst suitable for DBT dehydrogenation. Particularly, the $CeO_2$ support is used instead of the conventionally used $Al_2O_3$ in order to minimize a decrease in reaction rate, caused by mass transfer important for DBT dehydrogenation, and to improve the reaction rate in RDS through the interaction between platinum and the support. In this manner, there are provided a catalyst having a catalytic quality for dehydrogenation about 10 times higher than the quality of the known commercially available catalyst, and a method for preparing the catalyst. The method for preparing a catalyst according to the present disclosure and the catalyst obtained thereby are applicable to dehydrogenation of various organic materials as well as materials for LOHC.

Test Example 2

Mass transfer may significantly affect LOHC dehydrogenation depending on types of LOHC materials, when applying the catalyst according to the present disclosure to LOHC dehydrogenation. Therefore, dehydrogenation catalysts optimized for LOHC materials may be developed by controlling the pore size through the control of calcination temperature. The following Table 2 shows the results of catalyst size, etc., depending on calcination temperature.

TABLE 2

|  | Calcination temperature (° C.) | | |
| --- | --- | --- | --- |
|  | 600 | 700 | 800 |
| Pore size (nm) | 12.6 | 13.7 | 14.7 |
| Metal specific surface area (m²/g metal) | 126.2 | 120.2 | 117.5 |
| Metal dispersibility (%) | 51.1 | 48.7 | 47.6 |

As can be seen from the above results, it is possible to control pore size, metal specific surface area, or the like, depending on calcination temperature. The optimized pore size may be selected depending on the particular type of hydrogen storage compound for LOHC. In other words, when mass transfer is issued, the optimized catalyst capable of maximizing metal specific surface area and dispersibility may be developed, while pore size is increased by increasing calcination temperature.

According to the present disclosure, GNP may be applied not only to Pt but also the other metals, such as Ni, Pd, Ru, Ir and Re, and the other supports, such as $TiO_2$ and $SiO_2$, may also be used.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A catalyst for dehydrogenation of liquid organic hydrogen carriers, comprising:
    a support; and
    a catalytically active ingredient on the support,
    wherein the support has a pore size of 10 nm or more,
    wherein the catalytically active ingredient is Pt, the support is $CeO_2$, and Pt is used in an amount of 2-7 wt % based on the $CeO_2$.

2. The catalyst for dehydrogenation of liquid organic hydrogen carriers of claim 1, wherein the pore size is 12-30 nm.

3. The catalyst for dehydrogenation of liquid organic hydrogen carriers of claim 1, wherein the catalyst is calcined after it is burned by glycine-nitrate process (GNP).

4. A method for preparing a catalyst for liquid organic hydrogen carriers, comprising:
  mixing a support precursor and a precursor of catalytically active ingredient, in the form of a nitrate, together with glycine in a solution;
  carrying out combustion of the mixture in the mixing step; and
  carrying out calcination of powder obtained from the combustion step,
  wherein the support precursor is cerium (III) nitrate hexahydrate, and the precursor of catalytically active ingredient is tetraamineplatinum (II) nitrate.

5. The method for preparing a catalyst for liquid organic hydrogen carriers of claim 4, further comprising:
  selecting a calcination temperature based on a desired support pore size.

6. A catalyst for dehydrogenation of liquid organic hydrogen carriers obtained by the method of claim 4.

* * * * *